United States Patent Office 3,097,930
Patented July 16, 1963

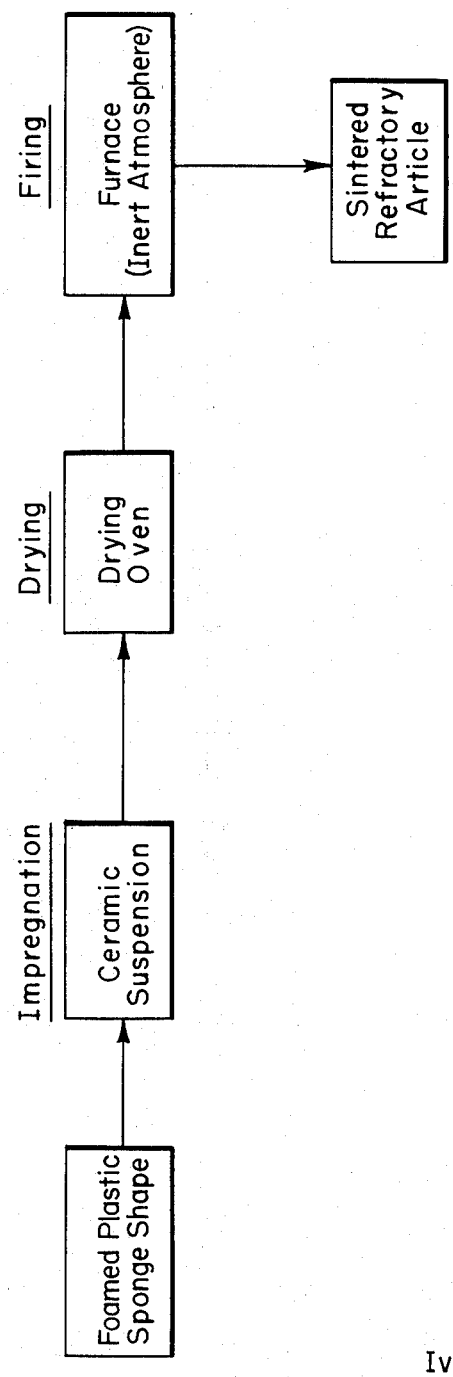

3,097,930
METHOD OF MAKING A POROUS SHAPE OF SINTERED REFRACTORY MATERIAL
Ivor James Holland, Milford Haven, England, assignor to Consolidated Beryllium Limited, London, England
Filed Mar. 7, 1961, Ser. No. 93,843
Claims priority, application Great Britain Mar. 9, 1960
8 Claims. (Cl. 25—156)

This invention relates to porous shapes and their manufacture from refractory material such as refractory clays, minerals, oxides, borides, carbides, silicides, nitrides and the like and mixture of these.

The invention consists in a method of making porous shapes comprising impregnating a sponge shape of the intercommunicating cell type with a suspension or dispersion of refractory particles in a liquid, treating the shape to remove the liquid and the material of the sponge and sinter the refractory particles together.

The sponge material may be any material which can be suitably removed e.g. by heating in an inert atmosphere to break down and volatilize off.

Such materials as polystyrene, polyethylene, polyvinyl chloride, latex and polyurethane foamed sponges may be suitable and the last mentioned is particularly preferred. The foam softens at a low temperature e.g. 60° C. and therefore stress caused by difference in expansion is relieved before it can disrupt the unsintered structure.

To impregnate the sponge it may be compressed to exclude a certain amount of air and immersed in the suspension or dispersion of the required refractory material. The shape is allowed to regain its original shape while immersed in the suspension or dispersion, thereby absorbing a certain amount. The shape may then be further compressed and allowed to expand in order completely to fill the voids with the suspension or dispersion.

Thereafter the shape may be again compressed to extrude as predetermined quality of the suspension or dispersion.

The shape may then be dried to deposit the refractory material throughout the shape.

The quantity of refractory material deposited will be related to the specific gravity of the suspension or dispersion and the amount of compression and re-expansion of the shape. By variation of these factors a wide range of porosity and pore size of the finished product may be obtained.

The dried shape is fired in an inert atmosphere or using low temperatures initially to prevent combustion, to produce a porous shape consisting of a large number of hollow refractory spheres connected by bridges of sintered refractory material. The foamed plastic is entirely volatilized during the firing and no ash remains to act as a flux so the refractoriness of the finished product is unaffected.

The invention further consists of the porous shapes of sintered refractory material prepared by the above method.

The single FIGURE of the accompanying drawing is a simplified flow sheet of my new process for making porous shapes of sintered refractory material.

Shapes such as high-temperature insulating blocks, having a graded port size or porosity may be made by combining a number of shapes of impregnated plastic foam before drying and firing, the respective layers having the desired properties. An impermeable face may also be applied either before or after firing.

Also a fired shape produced according to the invention may be subsequently impregnated and refired to give a denser structure. This method might be particularly applicable for building up large shapes.

*Example 1*

A slab of polyether foam, 10.5 cms. x 11.0 cms., x 11.8 cms. was immersed in a deflocculated suspension of alumina in dilute hydrochloric acid. The specific gravity of the suspension was 2.3 and the pH 3.0 with a particle size distribution of approximately—

| Particle size range, diameter in microns: | Percent |
|---|---|
| $+10$ | 35 |
| $-10 +5$ | 30 |
| $-5 +2$ | 30 |
| $-2 +1$ | 4 |
| $-1$ | 1 |

The legend "$-10 +5$" means particles less than 10 microns in equivalent diameter and greater than 5 microns in equivalent diameter; the legend "$-5 +2$" means particles less than 5 microns in equivalent diameter and greater than 2 microns in equivalent diameter; and the legend "$-2 +1$" means particles less than 2 microns in equivalent diameter and greater than 1 micron in equivalent diameter.

The slab of foamed plastic was compressed as fully as possible in order to eliminate all entrapped air, and subsequently allowed to regain its original shape whilst fully immersed in the suspension. A volume of suspension approximately equivalent to the volume of the slab was thus absorbed and retained within the pore structure.

The fully saturated slab, weighing 470 grams, was removed from the suspension and placed between two flat plates of perforated wood. Pressure was applied to the top plate, and the 1.8 cms. dimension reduced to 0.8 cm., thereby displacing 5/9 of the original volume of suspension.

Pressure was then released and the specimen allowed to regain its original dimensions. The total weight of the block at this stage was approximately 210 grams.

The block was then transferred to a dryer and maintained at a temperature of 100° C. for 2 hours. On cooling the block was found to be quite rigid and easily handled without damage or deformation.

The block was subsequently fired in an inert atmosphere to a maximum temperature of 1700° C. and maintained at this temperature for 2 hours.

Slight dimensional changes were found to have taken place, and the fully fired block was found to measure 10 cms. x 10.5 cms. x 1.7 cms., equivalent to a linear contraction of approximately 5%.

The final fired weight of the block was found to be 157 grams, corresponding to a bulk density of 0.88 gm./cm.$^{-3}$, or 78% porosity.

A number of specimens of lightweight alumina were prepared by the above technique, but with varying amounts of displacement of the absorbed suspension, thereby altering the final fired bulk density; results are summarized below:

| Fired dimensions in Cms. | | | Weight, Grams | Bulk Density Fired, gms./cm.$^{-3}$ | Crushing Strength lbs./in.$^2$ |
|---|---|---|---|---|---|
| Length | Breadth | Thickness | | | |
| 4.3 | 2.0 | 1.7 | 7.0 | 0.48 | 470 |
| 4.0 | 1.7 | 1.7 | 8.0 | 0.69 | 820 |
| 10.5 | 10.0 | 1.7 | 157.0 | 0.88 | 1,320 |
| 6.0 | 4.3 | 0.8 | 38.7 | 1.39 | 2,016 |
| 4.3 | 2.0 | 1.7 | 30.0 | 2.05 | 3,580 |

Total linear contraction in all cases was observed to be approximately 5%.

EXAMPLE II

Further tests were carried out on porous beryllia prepared by the same technique. In this case a suspension of beryllia in dilute hydrochloric acid was used of specific gravity 1.9, pH 2.2 with a particle size distribution of approximately—

Particles size range diameter in microns: Percent
+10 _____ 25
−10 +5 _____ 30
−5 +2 _____ 28
−2 +1 _____ 10
−1 _____ 7

The legend "+10" means particles greater than 10 microns in equivalent diameter; the legend "−10 +5" means particles less than 10 microns in equivalent diameter and greater than 5 microns in equivalent diameter; the legend "−5 +2" means particles less than 5 microns in equivalent diameter and greater than 2 microns in equivalent diameter; the legend "−2 +1" means particles less than 2 microns in equivalent diameter and greater than 1 micron in equivalent diameter; and the legend "−1" means particles less than 1 micron in equivalent diameter.

The data on these specimens is summarized as follows:

| Fired dimensions in Cms. | | | Weight in Grams | Bulk Density Fired, gm./cm.$^{-3}$ |
|---|---|---|---|---|
| Length | Breadth | Thickness | | |
| 22.0 | 11.0 | 7.3 | 1,650 | 0.93 |
| 7.5 | 7.0 | 6.0 | 350 | 1.10 |
| 6.4 | 2.8 | 2.2 | 51 | 1.29 |

Total linear shrinkage on the above specimens was approximately 3%.

EXAMPLE III

Specimens were also prepared from a suspension of china clay in water, with 0.25% sodium hexa meta phosphate acting as a deflocculant. The specific gravity was of the suspension 1.6. Specimens were fired at 1350° C. and a total linear contraction of 7% was observed.

Bulk densities ranged from 0.45–1.2 gm./cm.$^{-3}$.

I claim:
1. A method of making a porous shape of sintered refractory material which comprises impregnating a foamed plastic sponge shape of the intercommunicating cell type with a suspension of refractory particles in a liquid, drying the impregnated shape to remove the liquid, and firing the dried shape in an inert atmosphere to volatilize the material of the sponge and to sinter the refractory particles together.

2. The method according to claim 1 in which the sintered shape is further impregnated with a suspension of refractory particles in a liquid and is again dried and fired to sinter the refractory particles together.

3. A method of making a porous shape of sintered refractory material which comprises impregnating a plurality of foamed plastic sponge shapes of the intercommunicating cell type with a suspension of refractory particles in a liquid, combining the plurality of impregnated sponge shapes, drying the combined impregnated sponge shapes to remove the liquid, and firing the dried combined shapes to volatilize the plastic material of the sponges and to sinter the refractory particles of the combined shapes together.

4. The method according to claim 3 in which the sintered shape is further impregnated with a suspension of refractory particles in a liquid and is again dried and fired to sinter the refractory particles together.

5. A method of making a porous shape of sintered refractory material which comprises impregnating a foamed plastic sponge shape of the intercommunicating cell type with a suspension of refractory particles in a liquid, drying the impregnated shape to remove the liquid, firing the dried shape in an inert atmosphere to volatilize the material of the sponge and to sinter the refractory particles together, the initial stage of the firing being carried out at a low temperature.

6. The method according to claim 5 in which the sintered shape is further impregnated with a suspension of refractory particles in a liquid and is again dried and fired to sinter the refractory particles together.

7. A method of making a porous shape of sintered refractory material which comprises impregnating a plurality of foamed plastic sponge shapes of the intercommunicating cell type with a suspension of refractory particles in a liquid, combining the plurality of impregnated sponge shapes, drying the combined impregnated sponge shapes to remove the liquid, firing the dried combined shapes to volatilize the plastic material of the sponges and to sinter the refractory particles of the combined shapes together, the initial stage of the firing being carried out at a low temperature.

8. The method according to claim 7 in which the sintered shape is further impregnated with a suspension of refractory particles in a liquid and is again dried and fired to sinter the refractory particles together.

References Cited in the file of this patent
UNITED STATES PATENTS

| | | |
|---|---|---|
| 1,870,437 | Barnitt et al. | Aug. 9, 1932 |
| 2,012,798 | Whittier | Aug. 27, 1935 |
| 2,474,201 | Raymond et al. | June 21, 1949 |
| 2,506,244 | Stopka | May 2, 1950 |
| 2,553,759 | Geiger | May 22, 1951 |
| 2,718,686 | Garbati | Sept. 27, 1955 |
| 2,877,532 | Heine | Mar. 17, 1959 |

FOREIGN PATENTS

| | | |
|---|---|---|
| 637,499 | Great Britain | May 17, 1950 |